(12) United States Patent
Sarwari et al.

(10) Patent No.: US 10,205,860 B1
(45) Date of Patent: Feb. 12, 2019

(54) CAMERA CHASSIS FOR A PANORAMIC CAMERA WITH ISOTHERMAL MOUNTING BASE

(71) Applicant: Altia Systems, Inc., Cupertino, CA (US)

(72) Inventors: Atif Sarwari, Saratoga, CA (US); Aurangzeb Khan, Portola Valley, CA (US)

(73) Assignee: Altia Systems, Inc., Cupertino, CA (US)

( * ) Notice: Subject to any disclaimer, the term of this patent is extended or adjusted under 35 U.S.C. 154(b) by 387 days.

(21) Appl. No.: 14/058,182

(22) Filed: Oct. 18, 2013

Related U.S. Application Data

(60) Provisional application No. 61/715,762, filed on Oct. 18, 2012.

(51) Int. Cl.
*H04N 5/225* (2006.01)
*H04N 5/232* (2006.01)

(52) U.S. Cl.
CPC ....... *H04N 5/2254* (2013.01); *H04N 5/23238* (2013.01)

(58) Field of Classification Search
CPC ........ G03B 15/03; G03B 17/02; G03B 17/04; G03B 17/56; G03B 19/04; H04N 5/2251; H04N 5/2252; H04N 5/2253; H04N 5/2254; H04N 2101/00

USPC ......... 348/373–376; 358/906; 396/419, 427, 396/428, 535, 539–541
See application file for complete search history.

(56) References Cited

U.S. PATENT DOCUMENTS

| | | | | |
|---|---|---|---|---|
| D606,573 S | * | 12/2009 | Testa | D16/200 |
| 8,248,524 B2 | * | 8/2012 | Chen | H04N 5/2253 348/374 |
| 8,665,339 B2 | * | 3/2014 | Shin | G02B 27/646 348/208.7 |
| 9,204,041 B1 | * | 12/2015 | Campbell | H04N 5/3532 |
| 2008/0164316 A1 | * | 7/2008 | Patel | G06K 7/10 235/462.43 |
| 2011/0249100 A1 | * | 10/2011 | Jayaram | H04N 5/2253 348/48 |
| 2012/0013729 A1 | * | 1/2012 | Barringer | G03B 17/02 348/82 |
| 2012/0154521 A1 | * | 6/2012 | Townsend | H04N 5/23238 348/36 |
| 2012/0242837 A1 | * | 9/2012 | Sasagawa | H04N 5/247 348/159 |
| 2013/0148016 A1 | * | 6/2013 | Oh | H04N 5/2253 348/374 |

\* cited by examiner

*Primary Examiner* — Lin Ye
*Assistant Examiner* — Chan T Nguyen
(74) *Attorney, Agent, or Firm* — HM Law Group LLP Vani Moodley, Esq.

(57) ABSTRACT

A chassis for use in a panoramic camera is disclosed. The chassis comprises a base; an a heat sink formed on a first portion of the base; and an isothermal mounting structure formed on a second portion of the base, wherein an isothermal mounting structure defines a plurality of mounting formations for securing imaging sensors thereto.

15 Claims, 2 Drawing Sheets

CAMERA CHASSIS FOR A PANORAMIC CAMERA WITH ISOTHERMAL MOUNTING BASE

This application claims the benefit of priority to U.S. Provisional Patent Application No. 61/715,762, which was filed on Oct. 18, 2012, the entire specification of which is incorporated herein by reference.

FIELD

Embodiments of the invention relate to thermal management. In particular, embodiments of the invention relate to thermal management for a panoramic camera.

BACKGROUND

Panoramic cameras have become increasingly popular due to their ability to capture images with a high horizontal field of view (FOV). Panoramic cameras may be classified into single sensor systems, or multiple sensor systems. In the case of a multiple sensor system, a plurality of individual sensors is mounted in a spaced apart configuration. The inventors have found that in the case of a multiple sensor panoramic camera, the individual sensors are very sensitive to thermal variations.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

In one aspect, a chassis for use in a panoramic camera is disclosed. The chassis comprises a base; an a heat sink formed on a first portion of the base; and an isothermal mounting structure formed on a second portion of the base, wherein an isothermal mounting structure defines a plurality of mounting formations for securing imaging sensors thereto.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
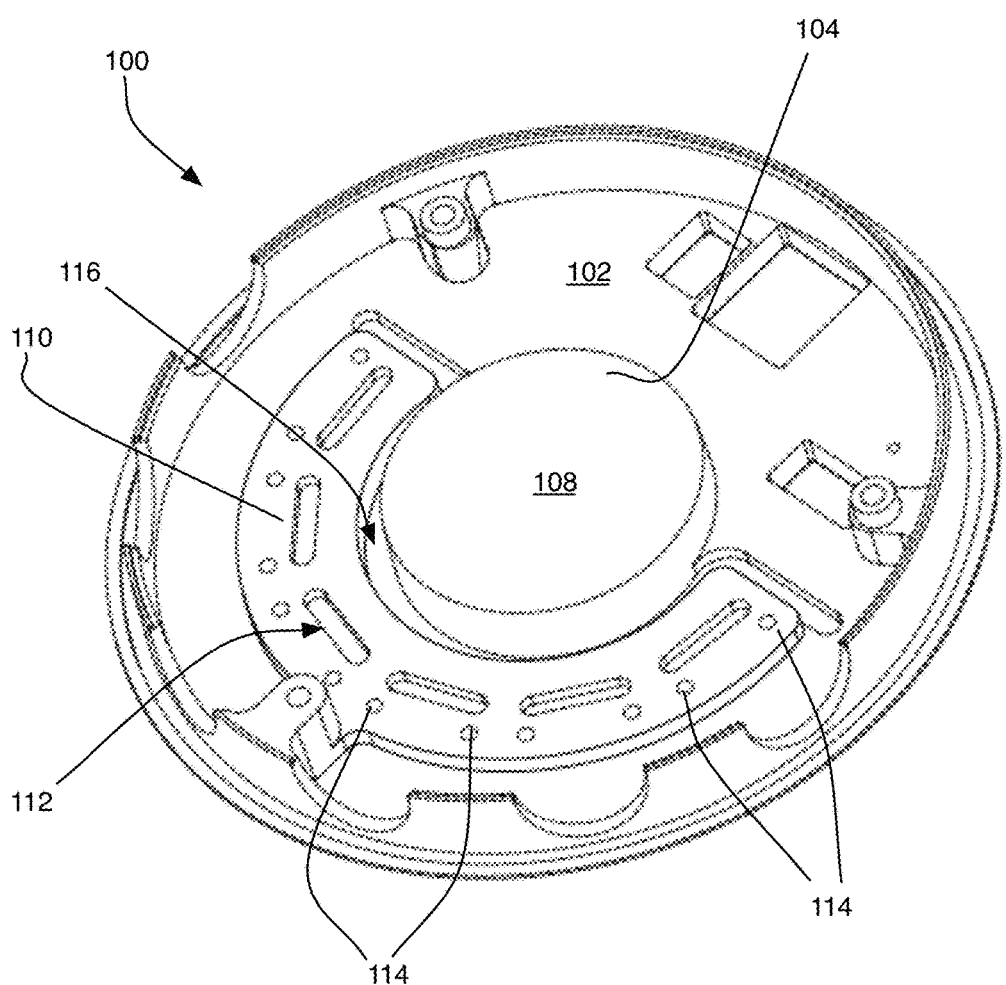
FIG. 1 shows a perspective view of a lower chassis for a panoramic camera, in accordance with one embodiment of the invention.

FIG. 1 shows a perspective view of an embodiment 100 of the inventive lower chassis for a panoramic camera. Referring to FIG. 1, it will be seen that the lower chassis includes a base portion 102 that defines a lower cover for the panoramic camera. Located centrally on the base portion 102 is a metal boss 104 which stands proud of the base portion 102. The metal boss 104 has a cylindrical profile and defines a flat upper surface 108. In use, a chip (e.g. a multiple imager video processor (MIVP)) may be mounted to abut or rest on the upper surface 108 of the metal boss 104. Thus, the chip (not shown) is thermally coupled with the metal boss 106 which essentially serves as a heat sink to dissipate heat away from the remaining components of the camera.

A sensor mounting plate 110 stands proud of the base portion 102. The sensor mounting plate 110, in the embodiment shown, defines an arc and includes slots 112 and apertures 114 to secure a sensor sub-assembly thereto, as is described in co-pending U.S. patent application Ser. No. 14/058,131 filed Oct. 18, 2013, which is incorporated herein by reference. It is important to note that the sensor mounting plate 110 is resistively isolated or at least partially thermally isolated from the metal boss 106 by a trench indicated generally by reference 116 formed between the metal boss 106 and the sensor mounting plate 110.

The design of the sensor mounting plate 110, and its separation from the metal boss 106 by the trench 116 ensures that imaging sensors mounted on the sensor mounting plate 110 remain on an isotherm. This ensures that temperature variations of the different imaging sensors mounted on the sensor mounting plate 110 are kept to a minimum. This improves operation of the panoramic camera.

Figure 2:
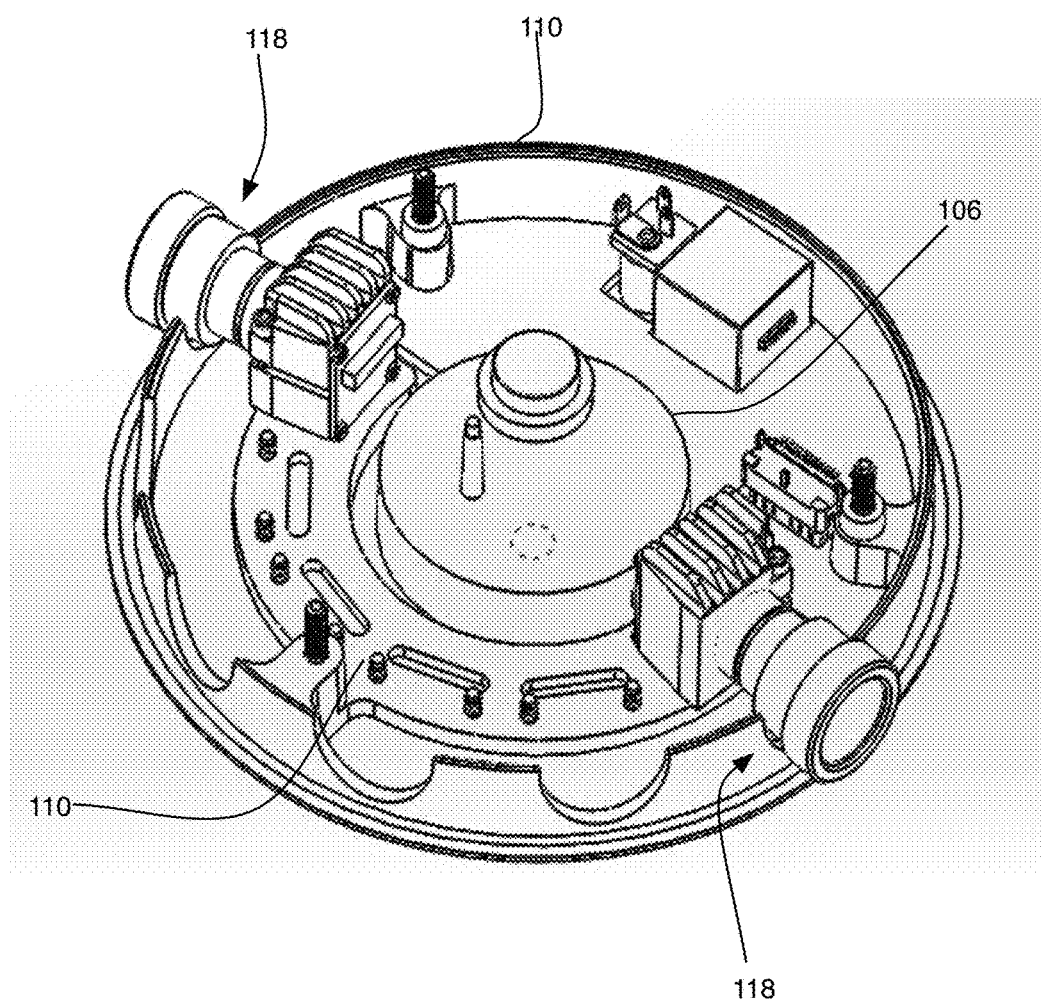
FIG. 2 illustrates the lower chassis of FIG. 1 with two sensor sub-assemblies 120 mounted thereon.

FIG. 2 illustrates the lower chassis 100 with two sensor sub-assemblies 120 mounted thereon.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for improving performance of imaging sensors in a multiple-sensor panoramic camera, comprising:
   providing an internal heat sink on a chassis for the panoramic camera, the heat sink comprising a metal boss is provided on the central portion of the chassis to dissipate heat generated by a main processor of the panoramic camera placed on top of the heat sink;
   providing an isothermal mounting structure on a peripheral portion of the chassis; and
   mounting a plurality of imaging sensors on the isothermal mounting structure.

2. The method of claim 1, wherein the isothermal structure is shaped in an arc.

3. The method of claim 1, further comprising resistively isolating the isothermal structure from the heat sink.

4. The method of claim 3, wherein the metal boss stands proud of the base of the chassis.

5. The method of claim 4, wherein resistively isolating the isothermal structure from the heat sink comprises forming a trench between the metal boss and the isothermal structure.

6. A chassis for use in a panoramic camera, comprising:
   a base provided on the chassis; and
   an internal heat sink comprising a metal boss is provided on top of the base and protruding out of the base, wherein the heat sink is formed on a central portion of the base in order to dissipate heat generated by a main processor of the panoramic camera placed on top of the heat sink; and
   an isothermal mounting structure formed on a peripheral portion of the base, wherein an isothermal mounting structure defines a plurality of mounting formations for securing imaging sensors thereto.

7. The chassis of claim 6, wherein the base, heat sink, and isothermal mounting structure are integrally formed.

8. The chassis of claim 7, formed by an injection molding process.

9. The chassis of claim 7, formed of aluminum.

10. The chassis of claim 7, further comprising a trench disposed between the heat sink and the isothermal mounting structure to resistively isolate the heat sink from the isothermal mounting structure.

11. A panoramic video camera, comprising:
   a chassis which includes:
      a base provided on the chassis; and
      an internal heat sink comprising a metal boss is provided on top of the base and protruding out of the base, wherein the heat sink is formed on a central portion of the base in order to dissipate heat generated by a main processor of the panoramic camera placed on top of the heat sink; and
      an isothermal mounting structure formed on a peripheral portion of the base, wherein an isothermal mounting structure defines a plurality of mounting formations for securing imaging sensors thereto.

12. The camera of a claim 11, wherein the base, heat sink, and isothermal mounting structure are integrally formed.

13. The camera of claim 12, wherein the chassis is formed by an injection molding process.

14. The camera of claim 11, wherein the chassis is formed of aluminum.

15. The camera of claim 11, wherein the chassis further comprises a trench disposed between the heat sink and the isothermal mounting structure to resistively isolate the heat sink from the isothermal mounting structure.

\* \* \* \* \*